United States Patent
Chen et al.

(10) Patent No.: US 12,159,465 B2
(45) Date of Patent: Dec. 3, 2024

(54) END-TO-END LEARNED LANE BOUNDARY DETECTION BASED ON A TRANSFORMER

(71) Applicant: TOYOTA RESEARCH INSTITUTE, INC., Los Altos, CA (US)

(72) Inventors: Kun-Hsin Chen, San Francisco, CA (US); Shunsho Kaku, Mountain View, CA (US); Jie Li, San Jose, CA (US); Steven Parkison, Ann Arbor, MI (US); Jeffrey M. Walls, Mountain View, CA (US); Kuan-Hui Lee, San Jose, CA (US)

(73) Assignees: TOYOTA RESEARCH INSTITUTE, INC.; TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 310 days.

(21) Appl. No.: 17/721,243

(22) Filed: Apr. 14, 2022

(65) Prior Publication Data
US 2023/0334876 A1   Oct. 19, 2023

(51) Int. Cl.
*G06V 20/56* (2022.01)
*B60W 60/00* (2020.01)
(Continued)

(52) U.S. Cl.
CPC ......... *G06V 20/588* (2022.01); *B60W 60/001* (2020.02); *G06N 3/02* (2013.01);
(Continued)

(58) Field of Classification Search
None
See application file for complete search history.

(56) References Cited

U.S. PATENT DOCUMENTS

| 10,867,190 B1* | 12/2020 | Vajna | G06V 10/776 |
| 2019/0147253 A1* | 5/2019 | Bai | G01S 17/931 |
| | | | 382/103 |

(Continued)

FOREIGN PATENT DOCUMENTS

| CN | 112785850 A | 5/2021 |
| CN | 113479191 A | 10/2021 |

(Continued)

OTHER PUBLICATIONS

Machine Translation of CN113627228A (Apr. 14, 2022 IDS for Item #2) relied upon in the Rejection obtained from STIC (Year: 2021).*

(Continued)

*Primary Examiner* — Tyler W. Sullivan
(74) *Attorney, Agent, or Firm* — SEYFARTH SHAW LLP

(57) ABSTRACT

A method for an end-to-end boundary lane detection system is described. The method includes gridding a red-green-blue (RGB) image captured by a camera sensor mounted on an ego vehicle into a plurality of image patches. The method also includes generating different image patch embeddings to provide correlations between the plurality of image patches and the RGB image. The method further includes encoding the different image patch embeddings into predetermined categories, grid offsets, and instance identifications. The method also includes generating lane boundary keypoints of the RGB image based on the encoding of the different image patch embeddings.

20 Claims, 8 Drawing Sheets

(51) Int. Cl.
  *G06N 3/02* (2006.01)
  *G06N 3/045* (2023.01)
  *G06T 7/10* (2017.01)
  *G06T 7/70* (2017.01)
  *G06T 9/00* (2006.01)
  *G06V 10/764* (2022.01)

(52) U.S. Cl.
  CPC .............. *G06T 7/10* (2017.01); *G06T 7/70* (2017.01); *G06T 9/00* (2013.01); *G06V 10/764* (2022.01); *B60W 2420/403* (2013.01); *G06N 3/045* (2023.01); *G06T 2207/10024* (2013.01); *G06T 2207/20021* (2013.01); *G06T 2207/30241* (2013.01); *G06T 2207/30256* (2013.01)

(56) References Cited

U.S. PATENT DOCUMENTS

| | | | | |
|---|---|---|---|---|
| 2019/0384304 | A1* | 12/2019 | Towal | G05D 1/0221 |
| 2021/0089836 | A1 | 3/2021 | Tang et al. | |
| 2021/0215481 | A1* | 7/2021 | Zhai | G06V 10/25 |
| 2022/0172066 | A1* | 6/2022 | Unterthiner | G06N 3/044 |
| 2022/0274625 | A1* | 9/2022 | Garimella | G06N 3/04 |

FOREIGN PATENT DOCUMENTS

| | | |
|---|---|---|
| CN | 113627228 A | 11/2021 |
| KR | 100482564 B1 | 4/2005 |

OTHER PUBLICATIONS

Liu et al., "A Review of Keypoints' Detection and Feature Description in Image Registration," Scientific Programming, Article ID 8509164, vol. 2021, Dec. 1, 2021.

Zhou et al., "Nonlinear Intensity Sonar Image Matching based on Deep Convolution Features," Nov. 29, 2021.

Miles et al., "Correlator Convolutional Neural Networks: An Interpretable Architecture for Image-like Quantum Matter Data," Nov. 6, 2020.

Capellier et al., "Fusion of neural networks, for LIDAR-based evidential road mapping," Journal of Field Robotics, Feb. 5, 2021.

Cheng et al., "Road Mapping and Localization using Sparse Semantic Visual Features," IEEE Robotics and Automation Letters, Aug. 11, 2021.

Spezialetti et al., "Learning to Orient Surfaces by Self-supervised Spherical CNNs," arXiv:2011.03298, Nov. 13, 2020.

Neubert, et al., Beyond Holistic Descriptors, Keypoints and Fixed Patches: Multi-scale Superpixel Grids for Place Recognition in Changing Environments, IEEE Robotics and Automation Letter, Dec. 2015.

Zhang, et al., "Hierarchical Road Topology Learning for Urban Map-less Driving", arXiv:2104.00084, Mar. 31. 2021.

* cited by examiner

END-TO-END LEARNED LANE BOUNDARY DETECTION BASED ON A TRANSFORMER

BACKGROUND

Field

Certain aspects of the present disclosure generally relate to machine learning and, more particularly, end-to-end learned lane boundary detection based on a transformer.

Background

Autonomous agents (e.g., vehicles, robots, etc.) rely on machine vision for sensing a surrounding environment and analyzing areas of interest in images of the surrounding environment. Although scientists have spent decades studying the human visual system, a solution for realizing equivalent machine vision remains elusive. Realizing equivalent machine vision is a goal for enabling autonomous agents. Machine vision is distinct from the field of digital image processing. Instead, machine vision recovers a three-dimensional (3D) structure of the world from images and uses the 3D structure for fully understanding a scene based on a two-dimensional camera input. That is, machine vision strives to provide a high-level understanding of a surrounding environment, as performed by the human visual system.

In operation, autonomous agents may rely on a trained deep neural network (DNN) to identify objects within areas of interest in an image of a surrounding scene of the autonomous agent. For example, a DNN may be trained to identify and track objects captured by one or more sensors, such as light detection and ranging (LIDAR) sensors, sonar sensors, red-green-blue (RGB) cameras, RGB-depth (RGB-D) cameras, and the like. In particular, the DNN may be trained to understand a scene from a camera (e.g., video/image) input based on annotations of automobiles within the scene. For example, autonomous operation, as well as advanced driver assistance systems (ADAS), may determine lane boundaries from RGB images. Unfortunately, the visual presentation of lane boundaries captured in RGB images are fairly long and skinny and are not easily identifiable.

SUMMARY

A method for an end-to-end boundary lane detection system is described. The method includes gridding a red-green-blue (RGB) image captured by a camera sensor mounted on an ego vehicle into a plurality of image patches. The method also includes generating different image patch embeddings to provide correlations between the plurality of image patches and the RGB image. The method further includes encoding the different image patch embeddings into predetermined categories, grid offsets, and instance identifications. The method also includes generating lane boundary keypoints of the RGB image based on the encoding of the different image patch embeddings.

A non-transitory computer-readable medium having program code recorded thereon for end-to-end boundary lane detection is described. The program code is executed by a processor. The non-transitory computer-readable medium includes program code to grid a red-green-blue (RGB) image captured by a camera sensor mounted on an ego vehicle into a plurality of image patches. The non-transitory computer-readable medium also includes program code to generate different image patch embeddings to provide correlations between the plurality of image patches and the RGB image. The non-transitory computer-readable medium also includes program code to encode the different image patch embeddings into predetermined categories, grid offsets, and instance identifications. The non-transitory computer-readable medium further includes program code to generate lane boundary keypoints of the RGB image based on the encoding of the different image patch embeddings.

A system for end-to-end boundary lane detection is described. The system includes an image patch generation module to grid a red-green-blue (RGB) image captured by a camera sensor mounted on an ego vehicle into a plurality of image patches. The system also includes an image patch embedding module to generate different image patch embeddings to provide correlations between the plurality of image patches and the RGB image. The system further includes an image patch encoding module to encode the different image patch embeddings into predetermined categories, grid offsets, and instance identifications. The system also includes a keypoint generation module to generate lane boundary keypoints of the RGB image based on the encoding of the different image patch embeddings.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
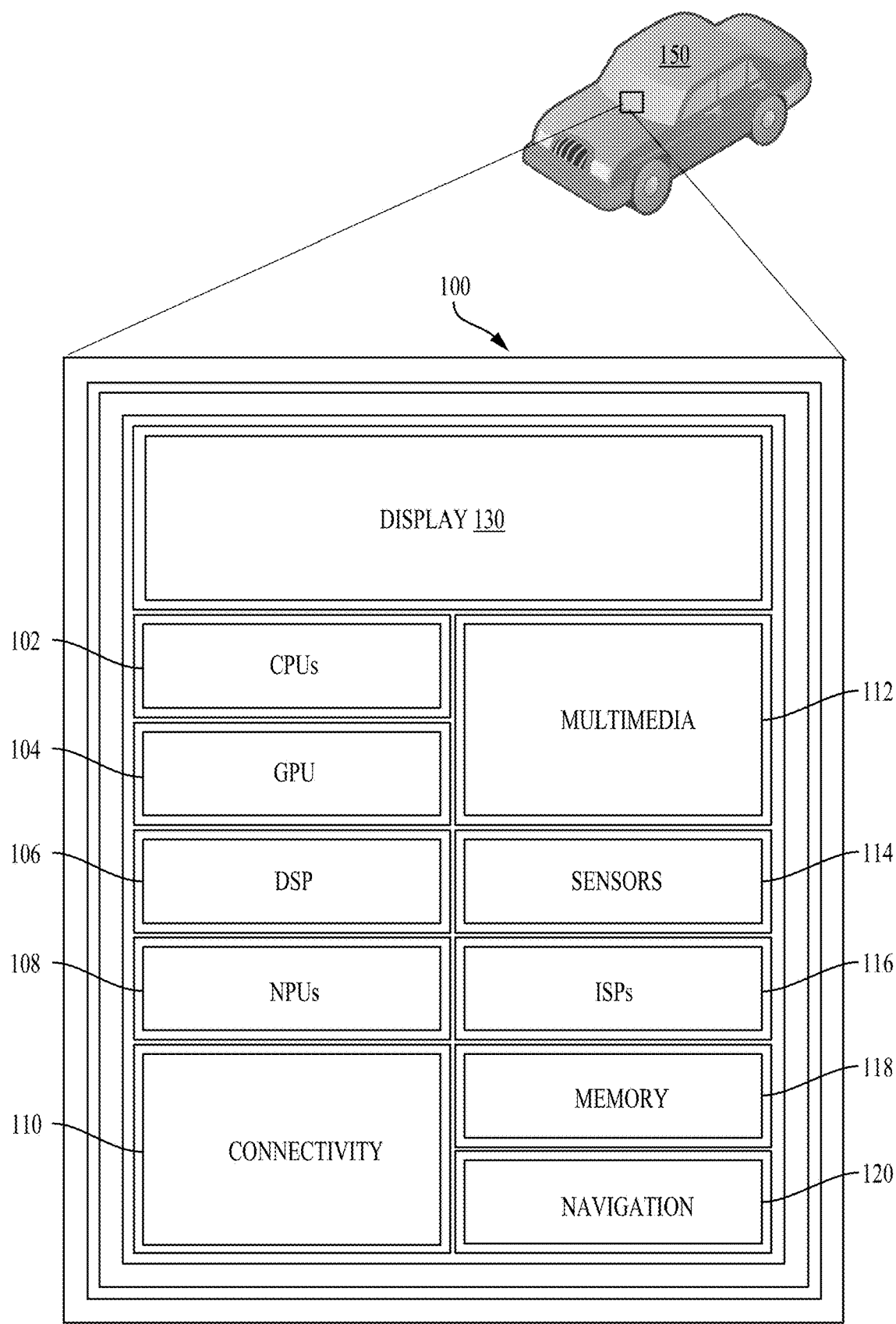
FIG. 1 illustrates an example implementation of designing a system using a system-on-a-chip (SOC) for end-to-end lane boundary detection, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality, in addition to or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Autonomous agents (e.g., vehicles, robots, etc.) rely on machine vision for sensing a surrounding environment and analyzing areas of interest in images of the surrounding environment. Although scientists have spent decades studying the human visual system, a solution for realizing equivalent machine vision remains elusive. Realizing equivalent machine vision is a goal for enabling autonomous agents. Machine vision is distinct from the field of digital image processing. Instead, machine vision recovers a three-dimensional (3D) structure of the world from images and uses the 3D structure for fully understanding a scene based on a two-dimensional camera input. That is, machine vision strives to provide a high-level understanding of a surrounding environment, as performed by the human visual system.

In operation, autonomous agents may rely on a trained deep neural network (DNN) to identify objects within areas of interest in an image of a surrounding scene of the autonomous agent. For example, a DNN may be trained to identify and track objects captured by one or more sensors, such as light detection and ranging (LIDAR) sensors, sonar sensors, red-green-blue (RGB) cameras, RGB-depth (RGB-D) cameras, and the like. In particular, the DNN may be trained to understand a scene from a camera (e.g., video/image) input based on annotations of automobiles within the scene. For example, autonomous operation, as well as advanced driver assistance systems (ADAS), may determine lane boundaries from RGB images. Unfortunately, the visual presentation of lane boundaries captured in RGB images are fairly long and skinny and are not easily identifiable.

Aspects of the present disclosure are directed to an end-to-end keypoint based model to estimate lane boundaries using an RGB image as an input. Some aspects of the present disclosure provide an improvement over the current technology by using the end-to-end keypoint based model to improve lane boundary estimation. One aspect of the present disclosure estimates lane boundaries by first gridding an RGB image into smaller image patches that are then fed into a transformer encoder. In some aspects of the present disclosure, the transformer encoder is trained to learn the correlation between different image patches.

In one aspect of the present disclosure, the lane boundary detection method follows a process flow, in which one or more RGB images are captured by a camera sensor mounted to an ego vehicle. The RGB images are first gridded so that the images can be broken down into a plurality of different image patches. The different image patches are then provided to a transformer encoder that generates image patch embedding's for providing a correlation between the different image patches and the RGB image. In some aspects of the present disclosure, the different image patches are sent to a multi-layer perceptron (MLP) block to learn the offset (x, y offsets from the center of the grid), category (background/solid/dashed, etc.), and an instance identification (ID) of keypoints in the different image patches. In other aspects of the present disclosure, the transformer encoder includes different heads to perform the functionality of the MLP block. Based on this information, in some aspects of the present disclosure, a post processing block generates lane boundary keypoints with corresponding instance IDs to estimate lane boundaries within the RGB image captured by an ego vehicle.

FIG. 1 illustrates an example implementation of the aforementioned system and method for end-to-end boundary detection using a system-on-a-chip (SOC) 100 of an ego vehicle 150. The SOC 100 may include a single processor or multi-core processors (e.g., a central processing unit (CPU)), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The system-on-a-chip (SOC) 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize poses of objects in an area of interest, according to the display 130, illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system (GPS).

The system-on-a-chip (SOC) 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100. In this aspect of the present disclosure, instructions loaded into a processor (e.g., CPU 102) or the NPU 108 of the ego vehicle 150 may include code for learning-based online mapping from an image captured by the sensor processor 114. The instructions loaded into a processor (e.g., CPU 102) may also include code for planning and control (e.g., of the ego vehicle 150) in response to end-to-end boundary detection from the images captured by the sensor processor 114.

The instructions loaded into a processor (e.g., CPU 102) may also include code to grid a red-green-blue (RGB) image captured by a camera sensor mounted on a vehicle into different image patches. The instructions loaded into a processor (e.g., CPU 102) may also include code to generate different image patch embedding's to provide correlations between the different image patches and the RGB image. The instructions loaded into a processor (e.g., CPU 102) may further include code to encode the different image patch embedding's into predetermined categories, grid offsets, and instance identifications. The instructions loaded into a processor (e.g., CPU 102) may also include code to generate lane boundary keypoints of the RGB image based on the encoding of the image patch embedding's.

Figure 2:
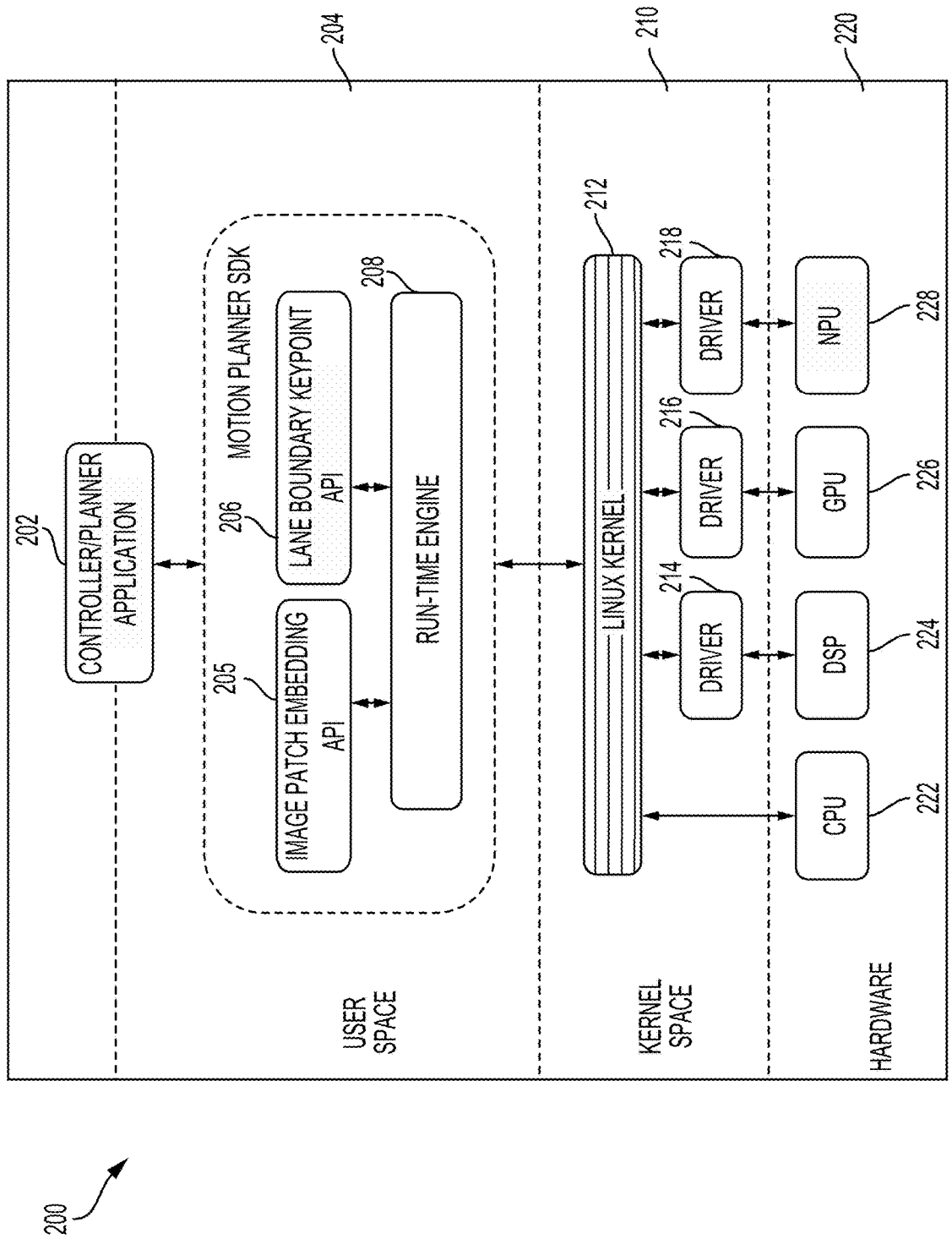
FIG. 2 is a block diagram illustrating a software architecture that may modularize functions for end-to-end lane boundary detection, according to aspects of the present disclosure.

FIG. 2 is a block diagram illustrating a software architecture 200 that may modularize functions for planning and control of an ego vehicle using end-to-end lane boundary detection, according to aspects of the present disclosure. Using the architecture, a controller/planner application 202 may be designed such that it may cause various processing blocks of a system-on-a-chip (SOC) 220 (for example a CPU 222, a DSP 224, a GPU 226, and/or an NPU 228) to perform supporting computations during run-time operation of the controller/planner application 202.

The controller/planner application 202 may be configured to call functions defined in a user space 204 that may, for example, analyze a scene in a video captured by a monocular camera of an ego vehicle for end-to-end lane boundary detection in the scene. In aspects of the present disclosure, end-to-end lane boundary detection is performed to enable planning and control of an ego vehicle. The controller/planner application 202 may make a request to compile program code associated with a library defined in an image patch embedding application programming interface (API) 205 to generate different image patch embedding's to provide correlations between different image patches and a red-green-blue (RGB) image. In this example, gridding of the RGB image captured by a camera sensor mounted on an ego vehicle is performed to generate different image patches. The controller/planner application 202 may also make a request to compile program code associated with a library defined in a lane boundary keypoint API 206. In some aspects of the present disclosure, the lane boundary keypoint API 206 generates lane boundary keypoints of the RGB image based on the encoding of the image patch embedding's.

A run-time engine 208, which may be compiled code of a run-time framework, may be further accessible to the controller/planner application 202. The controller/planner application 202 may cause the run-time engine 208, for example, to perform end-to-end lane boundary detection within images captured by a camera sensor mounted on the ego vehicle. When a boundary is detected within a predetermined distance of the ego vehicle, the run-time engine 208 may in turn send a signal to an operating system 210, such as a Linux Kernel 212, running on the system-on-a-chip (SOC) 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214, 216, and 218 for the DSP 224, for the GPU 226, or for the NPU 228. In the illustrated example, the deep neural network (DNN) may be configured to run on a combination of processing blocks, such as the CPU 222 and the GPU 226, or may be run on the NPU 228, if present.

Figure 3:
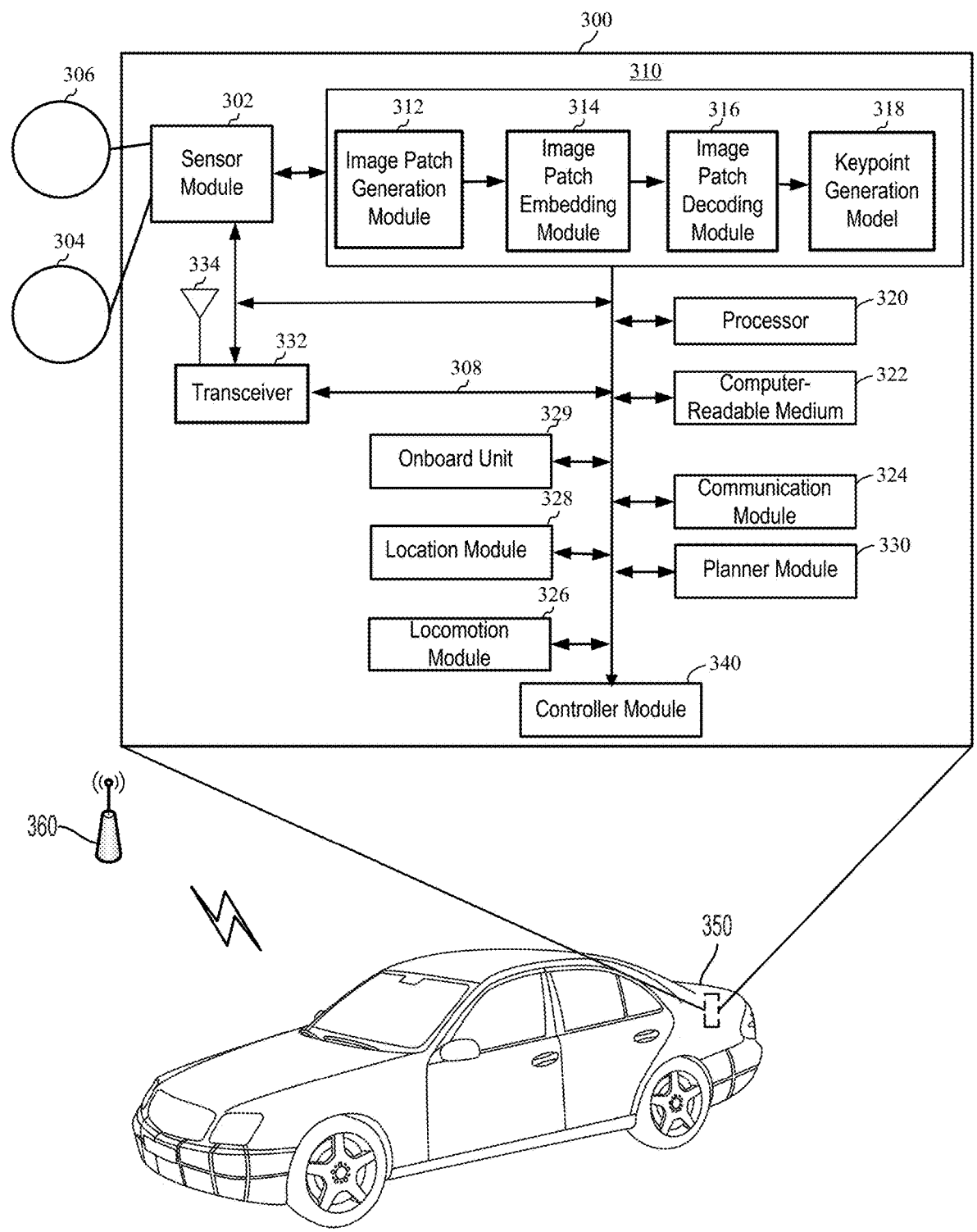
FIG. 3 is a diagram illustrating an example of a hardware implementation for an end-to-end lane boundary detection system, according to aspects of the present disclosure.

FIG. 3 is a diagram illustrating an example of a hardware implementation for an end-to-end lane boundary detection system, according to aspects of the present disclosure. An end-to-end lane boundary detection system 300 may be an end-to-end keypoint based model configured to estimate lane boundaries using a red-green-blue (RGB) image as an input. In some aspects of the present disclosure, the end-to-end lane boundary detection system 300 provides an improvement over current technology by using the end-to-end keypoint based model to improve lane boundary estimation.

In some aspects of the present disclosure, the end-to-end lane boundary detection system 300 may estimate lane boundaries by first gridding the RGB image into smaller image patches that are then fed into a transformer encoder. In these aspects of the present disclosure, a transformer encoder is trained to learn correlations between the different image patches and the RGB image. The end-to-end lane boundary detection system 300 may be configured to encode the different image patch embedding's into predetermined categories, grid offsets, and instance identifications (IDs). In some aspects of the present disclosure, a post processing block generates lane boundary keypoints with corresponding instance IDs to estimate lane boundaries within the RGB image captured by a car 350. Improved planning and controlling of the car 350 are achieved by the improved lane boundary detection in images from video captured through a camera during operation of the car 350.

The end-to-end lane boundary detection system 300 may be a component of a vehicle, a robotic device, or other device. For example, as shown in FIG. 3, the end-to-end lane boundary detection system 300 is a component of the car 350. Aspects of the present disclosure are not limited to the end-to-end lane boundary detection system 300 being a component of the car 350, as other devices, such as a bus, motorcycle, or other like vehicle, are also contemplated for using the end-to-end lane boundary detection system 300. The car 350 may be autonomous or semi-autonomous.

The end-to-end lane boundary detection system 300 may be implemented with an interconnected architecture, represented generally by an interconnect 308. The interconnect 308 may include any number of point-to-point interconnects, buses, and/or bridges depending on the specific application of the end-to-end lane boundary detection system 300 and the overall design constraints of the car 350. The interconnect 308 links together various circuits, including one or more processors and/or hardware modules, represented by a sensor module 302, a vehicle perception module 310, a processor 320, a computer-readable medium 322, a communication module 324, a locomotion module 326, a location module 328, an onboard unit 329, a planner module 330, and a controller module 340. The interconnect 308 may also link various other circuits, such as timing sources, peripherals, voltage regulators, and power management circuits, which are well known in the art, and therefore, will not be described any further.

The end-to-end lane boundary detection system 300 includes a transceiver 332 coupled to the sensor module 302, the vehicle perception module 310, the processor 320, the computer-readable medium 322, the communication module 324, the locomotion module 326, the location module 328, the onboard unit 329, the planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the car 350. As another example, the transceiver 332 may transmit keypoints of lane boundaries within a video and/or planned actions from the vehicle perception module 310 to a server (not shown).

The end-to-end lane boundary detection system 300 includes the processor 320 coupled to the computer-readable medium 322. The processor 320 performs processing, including the execution of software stored on the computer-readable medium 322 to provide end-to-end lane boundary detection functionality, according to the present disclosure. The software, when executed by the processor 320, causes the end-to-end lane boundary detection system 300 to perform the various functions described for ego vehicle perception of lane boundaries for an ego vehicle within video captured by a single camera of an ego vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 304 and a second sensor 306. The first sensor 304 may be a vision sensor (e.g., a stereoscopic camera or a red-green-blue (RGB) camera) for capturing two-dimensional (2D) RGB images. The second sensor 306 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 304 or the second sensor 306.

The images of the first sensor 304 and/or the second sensor 306 may be processed by the processor 320, the sensor module 302, the vehicle perception module 310, the communication module 324, the locomotion module 326, the location module 328, and the controller module 340. In conjunction with the computer-readable medium 322, the images from the first sensor 304 and/or the second sensor 306 are processed to implement the functionality described herein. In one configuration, feature information determined from images captured by the first sensor 304 and/or the second sensor 306 may be transmitted via the transceiver 332. The first sensor 304 and the second sensor 306 may be coupled to the car 350 or may be in communication with the car 350.

In operation, autonomous agents may rely on a trained deep neural network (DNN) to identify objects within areas of interest in an image of a surrounding scene of the autonomous agent. For example, a DNN may be trained to identify and track objects captured by one or more sensors, such as light detection and ranging (LIDAR) sensors, sonar sensors, red-green-blue (RGB) cameras, RGB-depth (RGB-D) cameras, and the like. In particular, the DNN may be trained to understand a scene from a camera (e.g., video/image) input based on annotations of automobiles within the scene. For example, autonomous operation, as well as advanced driver assistance systems (ADAS), may determine lane boundaries from RGB images. Unfortunately, the visual presentation of lane boundaries captured in RGB images are fairly long and skinny and are not easily identifiable.

In some aspects of the present disclosure, the end-to-end lane boundary detection system 300 provides an improvement over current technology by using an end-to-end keypoint based model to improve lane boundary estimation. The end-to-end lane boundary detection system 300 generates different image patch embedding's to provide correlations between different image patches and a red-green-blue (RGB) image. In this example, gridding of the RGB image captured by a camera sensor mounted on the car 350 is performed to generate the different image patches. The end-to-end lane boundary detection system 300 may generate lane boundary keypoints of the RGB image based on an encoding of the different image patch embedding's. Improved planning and controlling of the car 350 are achieved by the improved lane boundary detection in images from video captured through a camera during operation of the car 350.

Connected vehicle applications support vehicle-to-vehicle (V2V) communications and vehicle-to-infrastructure (V2I) communications with wireless technology. For example V2V communications use wireless signals to send information back and forth between other connected vehicles (e.g., location, speed, and/or direction). Conversely, V2I communications involve V2I (e.g., road signs or traffic signals) communications, generally involving vehicle safety issues. For example, V2I communications may request traffic information from a traffic management system to determine best possible routes. V2V and V2I applications for connected vehicles dramatically increase automotive safety by transforming vehicle operation.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module 328 compliant with one or more of the following DSRC standards, including any derivative or fork thereof: EN 12253:2004 Dedicated Short-Range Communication—Physical layer using microwave at 5.9 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

A dedicated short-range communication (DSRC)-compliant global positioning system (GPS) unit within the location module 328 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the parking space of the car 350. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, long term evolution (LTE), third generation (3G), etc. The communication module 324 may also communicate with other components of the car 350 that are not modules of the end-to-end lane boundary detection system 300. The transceiver 332 may be a communications channel through a network access point 360. The communications channel may include dedicated short-range communication (DSRC), LTE, LTE-device-to-device (D2D) (LTE-D2D), mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, dedicated short-range communication (DSRC), full-duplex wireless communications, mmWave, Wi-Fi (infrastructure mode), Wi-Fi (ad-hoc mode), visible light communication, TV white space communication, and satellite communication. The network access point 360 may also include a mobile data network that may include third generation (3G), fourth generation (4G), fifth generation (5G), long term evolution (LTE), LTE-vehicle-to-everything (V2X) (LTE-V2X), LTE-device-to-device (D2D) (LTE-D2D), voice over long term evolution (VoLTE), or any other mobile data network or combination of mobile data networks. Further, the network access point 360 may include one or more Institute of Electrical and Electronics Engineers (IEEE) 802.11 wireless networks.

The end-to-end lane boundary detection system 300 also includes the planner module 330 for planning a selected trajectory to perform a route/action (e.g., collision avoidance) of the car 350, and the controller module 340 to control the locomotion of the car 350. The controller module 340 may perform the selected action via the locomotion module 326 for autonomous operation of the car 350 along, for example, a selected route. In one configuration, the planner module 330 and the controller module 340 may collectively override a user input when the user input is expected (e.g., predicted) to cause a collision according to an autonomous level of the car 350. The modules may be software modules running in the processor 320, resident/ stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and highly autonomous vehicle.

The vehicle perception module 310 may be in communication with the sensor module 302, the processor 320, the computer-readable medium 322, the communication module 324, the locomotion module 326, the location module 328, the onboard unit 329, the planner module 330, the transceiver 332, and the controller module 340. In one configuration, the vehicle perception module 310 receives sensor data from the sensor module 302. The sensor module 302 may receive the sensor data from the first sensor 304 and the second sensor 306. According to aspects of the present disclosure, the vehicle perception module 310 may receive sensor data directly from the first sensor 304 or the second sensor 306. In this aspect of the present disclosure, the vehicle perception module performs end-to-end lane boundary detection from images captured by the first sensor 304 or the second sensor 306 of the car 350.

As shown in FIG. 3, the vehicle perception module 310 includes an image patch generation module 312, an image patch embedding module 314, an image patch encoding module 316, and a keypoint generation model 318. The image patch generation module 312, the image patch embedding module 314, the image patch encoding module 316, and the keypoint generation model 318 may be components of a same or different artificial neural network, such as a deep neural network (DNN). The image patch embedding module 314, the image patch encoding module 316, and the keypoint generation model 318 are not limited to a DNN. In operation, the vehicle perception module 310 receives a data stream from the first sensor 304 and/or the second sensor 306. The data stream may include a two-dimensional red-green-blue (2D RGB) image from the first sensor 304 and light detection and ranging (LIDAR) data points from the second sensor 306. The data stream may include multiple frames, such as image frames. In this configuration, the first sensor 304 captures monocular (single camera) 2D RGB images.

The vehicle perception module 310 is configured to understand a scene from a video input (e.g., the sensor module 302) based on keypoint generation describing objects of interest. For example, the objects of interest include, but are not limited to driving lanes, lane lines, intersections, stop lines, crosswalks, and the like, within the scene to perform a perception task during autonomous driving of the car 350. Aspects of the present disclosure are directed to end-to-end keypoint detection in images captured by the first sensor 304 and/or the second sensor 306 of the car 350. In operation, one or more RGB images are captured by the first sensor 304 and/or the second sensor 306 of the car 350. In this example, the image patch generation module 312 first grids the RGB images to breakdown the RGB images into different image patches. The different image patches are then provided to the image patch embedding module 314 to generate different image patch embedding's to provide correlations between the different image patches and the RGB image.

A transformer encoder of the image patch embedding module 314 may generate the image patch embedding's for providing the correlation between the different image patches and the RGB image. In some aspects of the present disclosure, the different image patches are sent to a multi-layer perceptron (MLP) block to learn the offset (x, y offsets from the center of the grid), category (background/solid/dashed, etc.) and an instance identification (ID) of keypoints in the different image patches. In other aspects of the present disclosure, the transformer encoder includes different heads to perform the functionality of the MLP block. Either of these options may be used to configure the image patch encoding module 316 to perform the functionality of the MLP block. Based on this information, in some aspects of the present disclosure, the keypoint generation model 318 generates lane boundary keypoints with corresponding instance IDs to estimate lane boundaries within the RGB image captured by the car 350, for example, as shown in FIG. 4.

Figure 4:
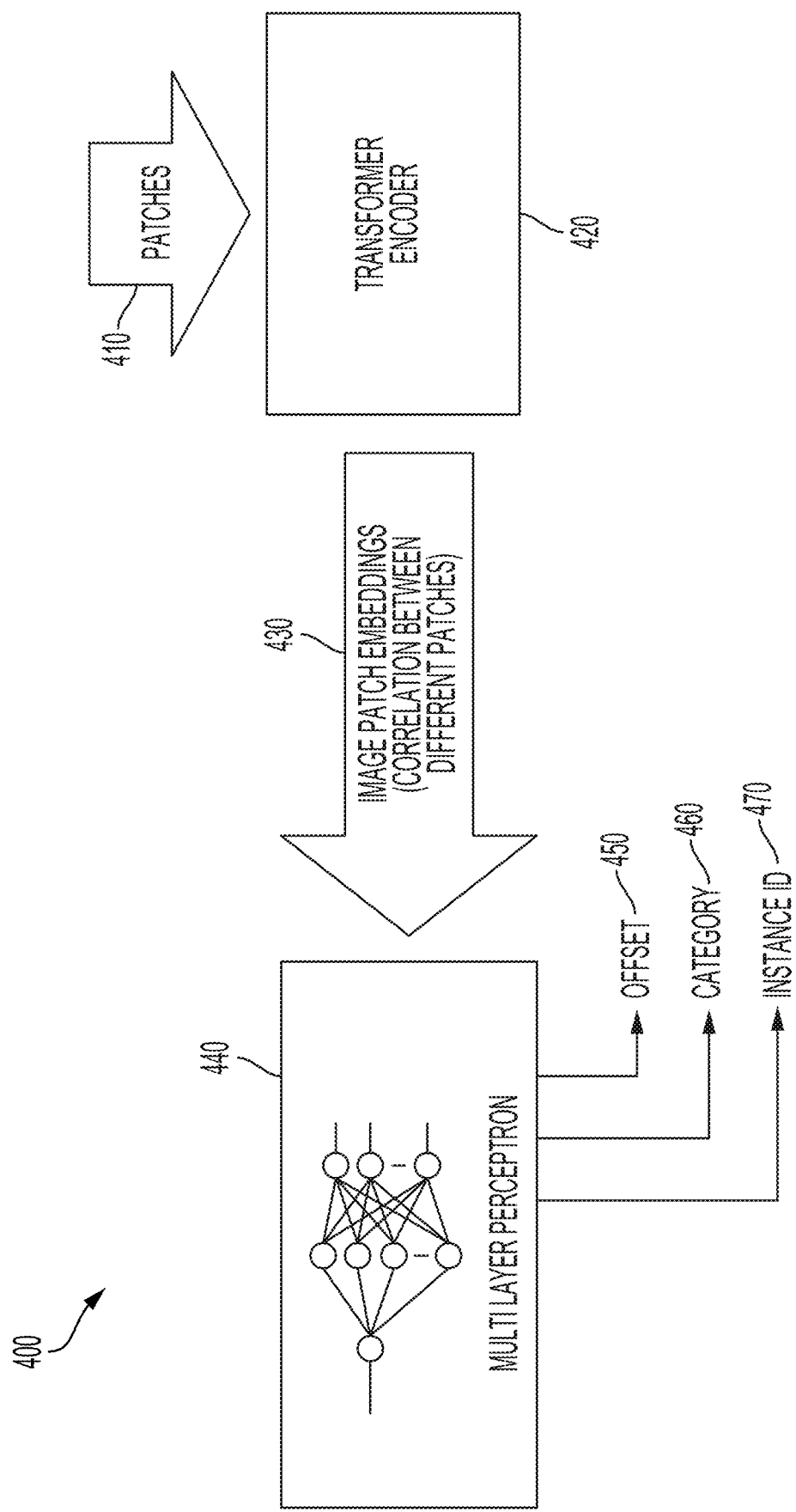
FIG. 4 is a block diagram illustrating an end-to-end keypoint model system for the end-to-end lane boundary detection system of FIG. 3, in accordance with an illustrative configuration of the present disclosure
Figures 5A, 5B:
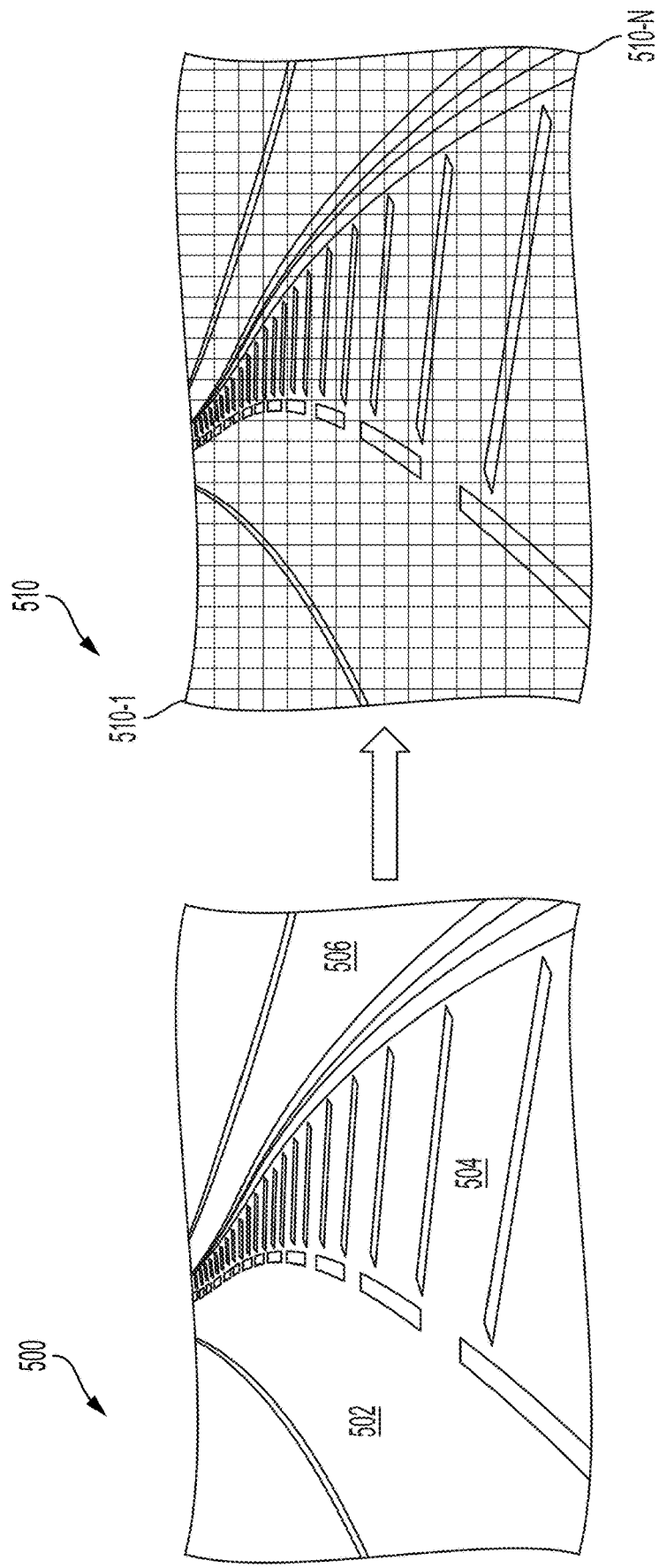
FIGS. 5A and 5B illustrate a process of gridding an image captured by a sensor mounted on an ego vehicle, according to aspects of the present disclosure.

FIG. 4 is a block diagram illustrating an end-to-end keypoint model system 400 for the end-to-end lane boundary detection system 300 of FIG. 3, in accordance with an illustrative configuration of the present disclosure. Representatively, the end-to-end keypoint model system 400 includes a transformer encoder 420 having an input to receive different image patches 410 based on gridding of an image captured by a sensor mounted on an ego vehicle. FIGS. 5A and 5B illustrate a process of gridding an image captured by a sensor mounted on an ego vehicle, according to aspects of the present disclosure.

For example, as shown in FIG. 5A, an image 500 captured by an ego vehicle illustrates a two-lane highway, in which the opposing first and second lanes 502 and 506 are separated by a painted median 504. As shown in FIG. 5B, a gridded image 510 is generated to provide image patches (510-1, . . . , 510-N). In aspects of the present disclosure, the image patches 410 are provided to the transformer encoder 420, as shown in FIG. 4. In some aspects of the present disclosure, the transformer encoder 420 processes the image patches 410 to generate different image patch embedding's 430, including correlations between the image patches 410. In this example, the image patch embedding's 430 are provided to a multi-layer perceptron (MLP) block 440. In this example, the MLP block 440 predicts an offset 450 (e.g., x, y offsets from the center of the image grid of FIG. 5B), a category 460 (e.g., background/solid/dashed, etc.), and an instance identification (ID) 470 of keypoints in the different image patches 410. The offset 450, the category 460, and the instance ID 470 may be provided to downstream processes, such as object detection, object tracking, and motion planning.

Figure 6:
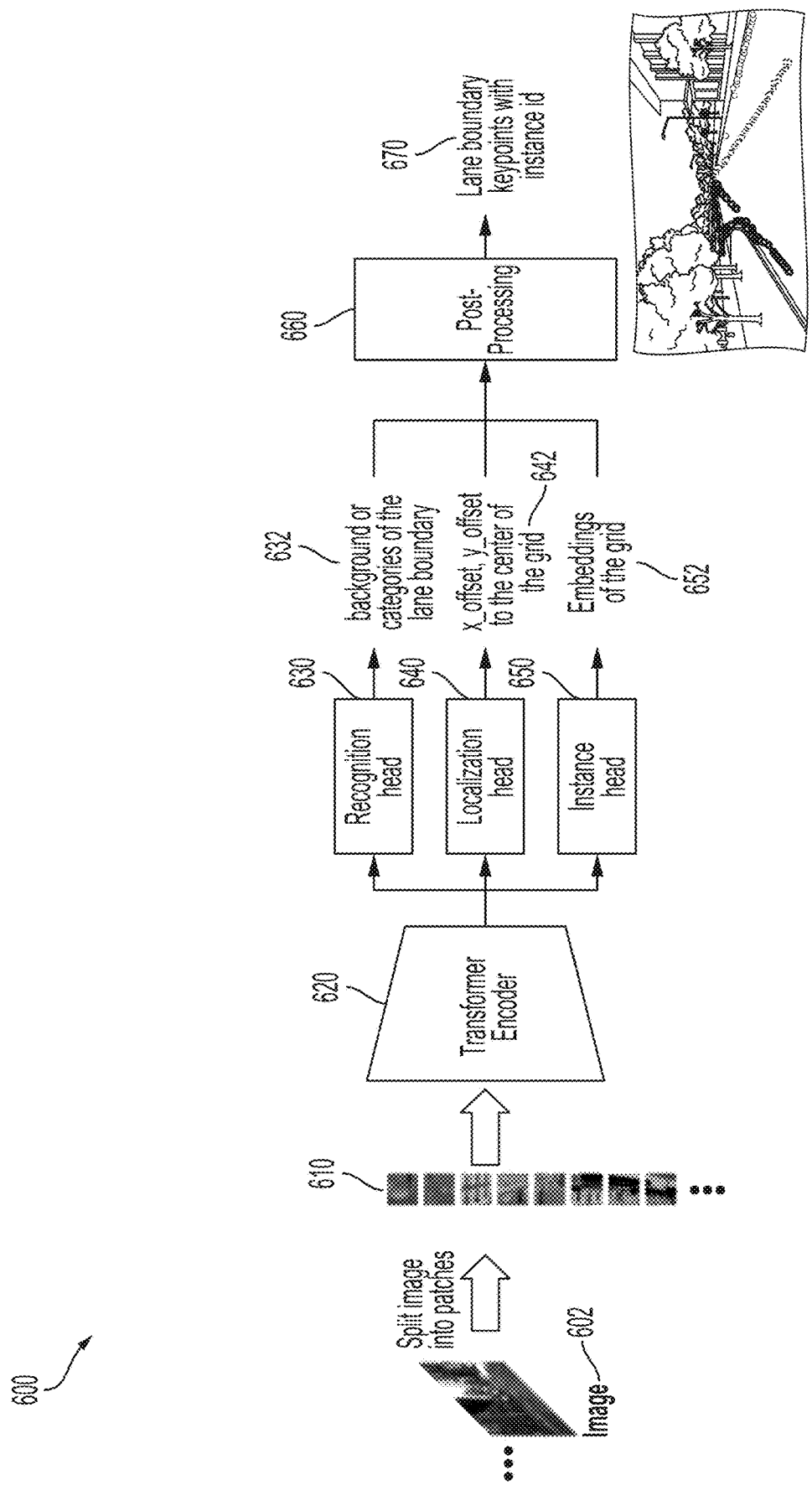
FIG. 6 is a block diagram illustrating an end-to-end keypoint model system for the end-to-end lane boundary detection system of FIG. 3, in accordance with another illustrative configuration of the present disclosure.

FIG. 6 is a block diagram illustrating an end-to-end keypoint model system 600 for the end-to-end lane boundary detection system 300 of FIG. 3, in accordance with another illustrative configuration of the present disclosure. As shown in FIG. 6, the end-to-end keypoint model system 600 splits an image 602 captured by front-facing cameras of an ego vehicle into different image patches 610. In the example of FIG. 6, the different image patches 610 are provided to a transformer encoder 620 for generating image patch embedding's, which may provide correlations between the different image patches 610 and the image 602.

In some aspects of the present disclosure, the transformer encoder 620 provides the image patch embedding's to a recognition head 630, a localization head 640, as well as an instance head 650. In this example, the recognition head 630 estimates a category 632 (e.g., background or category of the lane boundary such as solid, dashed, etc.). In addition, the localization head 640 predicts an offset 642 (e.g., x, y offsets from the center of the image grid of FIG. 5B). The instance head 650 may provide an embedding 652 of the different image patches 610, such as instance IDs of keypoints within the image 602. In some aspects of the present disclosure, the category 632, the offset 642, and the embedding 652 may be provided to a post processing block 660, configured to estimate lane boundary keypoints 670 with instance IDs, as further illustrated in FIG. 7.

Figure 7:
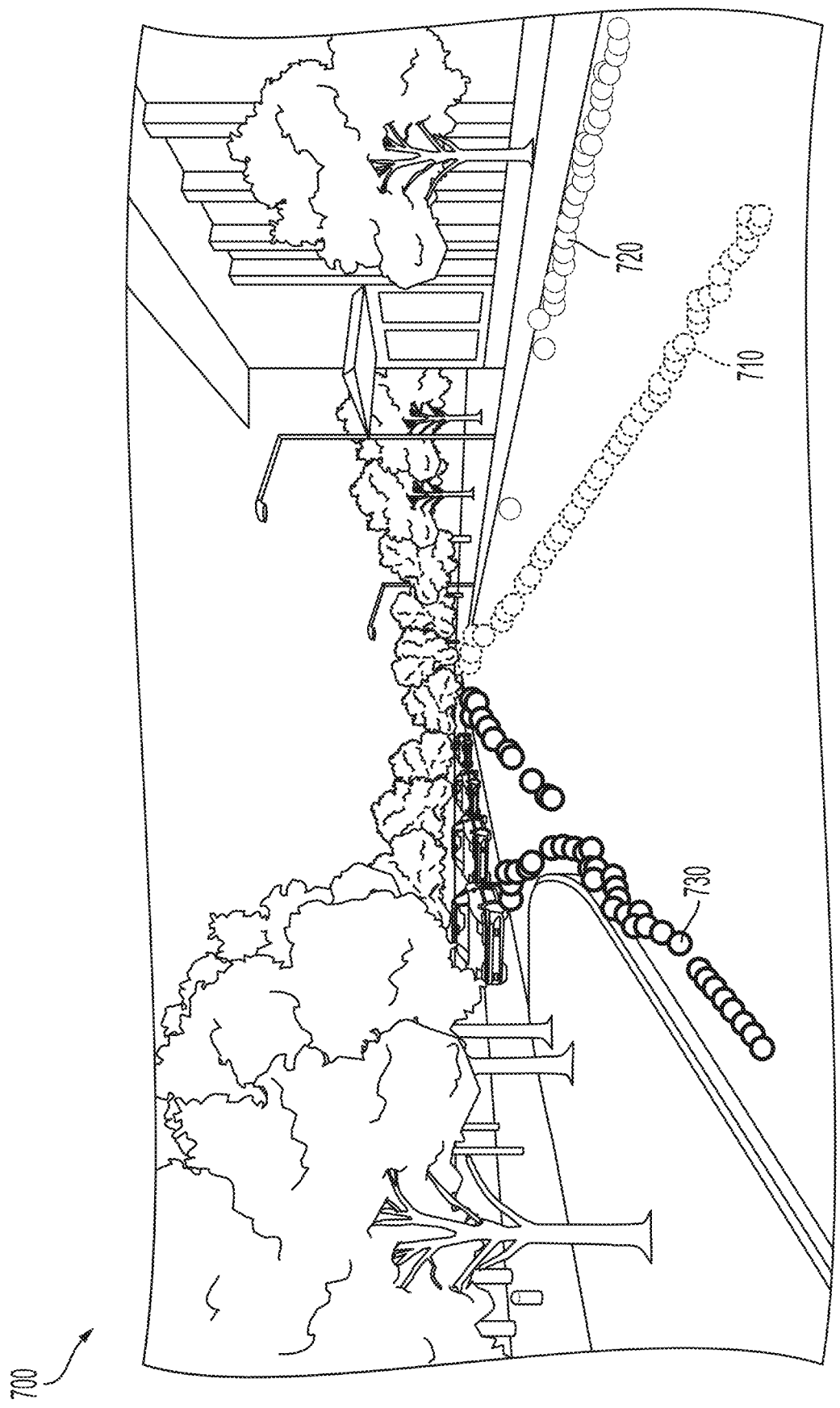
FIG. 7 is an image illustrating a lane boundary detection illustrated with keypoints overlaid on an image captured by a sensor mounted on an ego vehicle, according to aspects of the present disclosure.

FIG. 7 is an image illustrating a lane boundary detection illustrated with keypoints overlaid on an image captured by a sensor mounted on an ego vehicle, according to aspects of the present disclosure. For example, the image 700 is generated as captured by a front-facing camera of an ego vehicle. In this example, the image 700 shows a center line 710 of a roadway having a right lane boundary line 720 and a left lane boundary line 730. The overlaid keypoints on the image 700 clearly illustrate the center line 710, the right lane boundary line 720, and the left lane boundary line 730 of the roadway determined from the image 700. The overlaid keypoints on the image 700 may illustrate a right lane boundary line 720 and a left lane boundary line 730 of an exit lane of the roadway determined from the image 700. In contrast, other methodologies illustrate lane boundaries that are fairly long and skinny and are not easily identifiable rather than the keypoints of the detected lane boundaries overlaid on the image 700. A process for end-to-end boundary lane detection is illustrated, for example, in FIG. 8.

Figure 8:
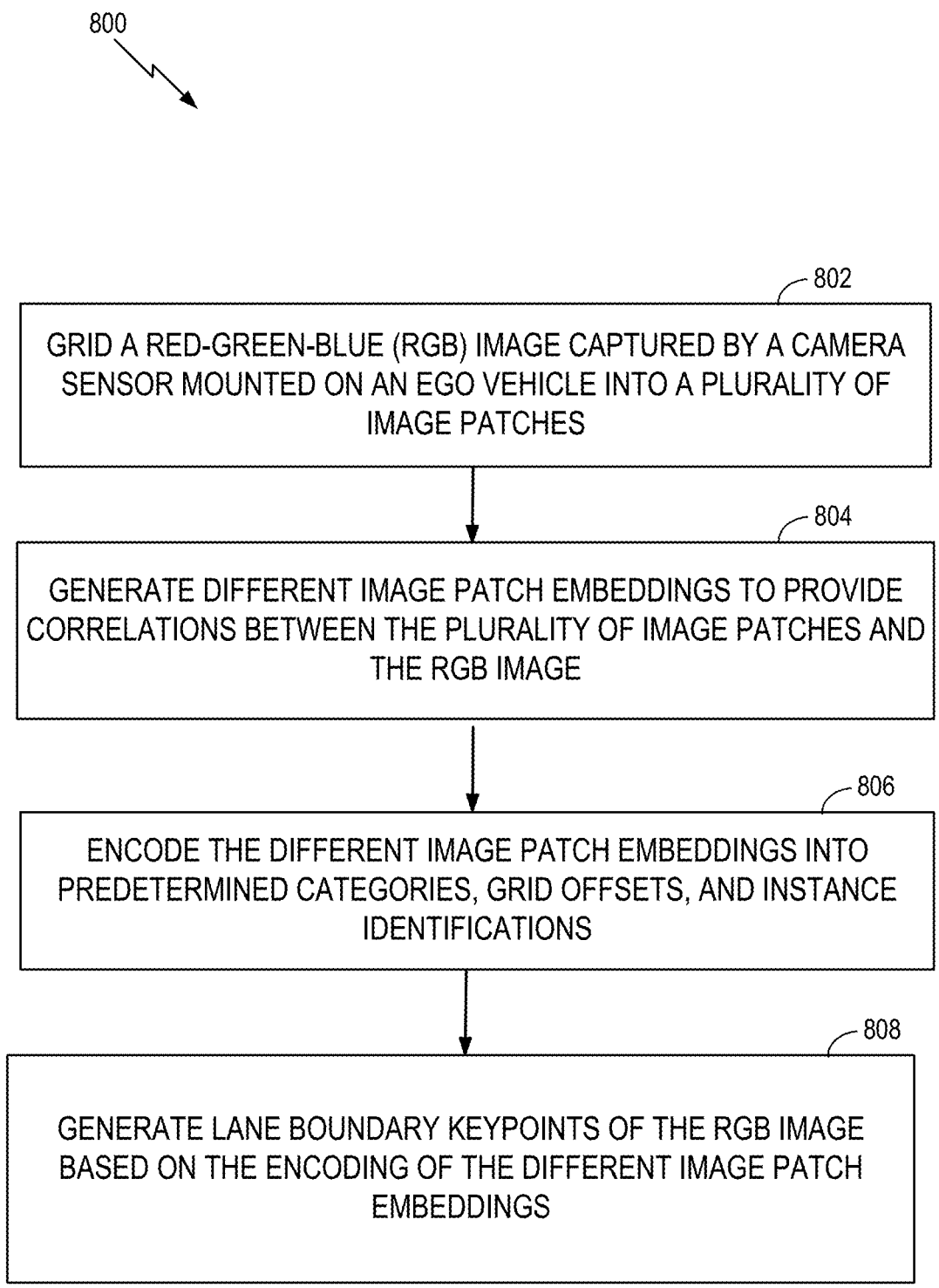
FIG. 8 is a flowchart illustrating a method for an end-to-end boundary lane detection system, according to aspects of the present disclosure.

FIG. 8 is a flowchart illustrating a method for an end-to-end boundary lane detection system, according to aspects of the present disclosure. The method 800 begins at block 802, in which a red-green-blue (RGB) image captured by a camera sensor mounted on a vehicle is gridded into a plurality of image patches. For example, as shown in FIG. 5A, an image 500 captured by an ego vehicle illustrates a two-lane highway, in which the opposing first and second lanes 502 and 506 are separated by a painted median 504. As shown in FIG. 5B, a gridded image 510 is generated to provide image patches (510-1, . . . , 510-N).

At block 804, different image patch embedding's are generated to provide correlations between the plurality of image patches and the RGB image. For example, as shown in FIG. 4, the transformer encoder 420 processes the image patches 410 to generate different image patch embedding's 430, including correlations between the image patches 410. As shown in FIG. 6, the different image patches 610 are provided to a transformer encoder 620 for generating image patch embedding's, which may provide correlations between the different image patches 610 and the image 602. In this example, the transformer encoder 620 provides the different image patch embedding's to the recognition head 630, the localization head 640, as well as the instance head 650.

At block 806, the different image patch embedding's are encoded into predetermined categories, grid offsets, and instance identifications. For example, as shown in FIG. 4, the MLP block 440 predicts an offset 450 (e.g., x, y offsets from the center of the image grid of FIG. 5B), a category 460 (e.g., background/solid/dashed, etc.), and an instance identification (ID) 470 of keypoints in the different image patches 410. The offset 450, the category 460, and the instance ID 470 may be provided to downstream processes, such as object detection, object tracking, and motion planning. As shown in FIG. 6, the recognition head 630 estimates a category 632 (e.g., background or category of the lane boundary such as solid, dashed, etc.). In addition, the localization head 640 predicts an offset 642 (e.g., x, y offsets from the center of the image grid of FIG. 5B). The instance head 650 may provide an embedding 652 of the different image patches 610, such as instance IDs of keypoints within the image 602.

At block 808, lane boundary keypoints of the RGB image are generated based on the encoding of the different image patch embedding's. For example, as shown in FIG. 7, the image 700 shows a center line 710 of a roadway having a right lane boundary line 720 and a left lane boundary line 730. The overlaid keypoints on the image 700 clearly illustrate the center line 710, the right lane boundary line 720, and the left lane boundary line 730 of the roadway determined from the image 700. In contrast, other methodologies illustrate lane boundaries that are fairly long and skinny and are not easily identifiable rather than the keypoints of the detected lane boundaries overlaid on the image 700.

The method 800 may generate the lane boundary keypoints as follows. The method 800 includes generating left boundary lane keypoints for a lane of a roadway. The method 800 also includes generating right boundary lane keypoints for the lane of the roadway. The method 800 further includes generating a center boundary lane keypoint for the lane of the roadway.

In some aspects of the present disclosure, the method 800 may be performed by the system-on-a-chip (SOC) 100 (FIG. 1) or the software architecture 200 (FIG. 2) of the ego vehicle 150 (FIG. 1). That is, each of the elements of method 800 may, for example, but without limitation, be performed by the SOC 100, the software architecture 200, or the processor (e.g., CPU 102) and/or other components included therein of the ego vehicle 150.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application-specific integrated circuit (ASIC), a field-programmable gate array (FPGA) signal or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read-only memory (ROM), flash memory, erasable programmable read-only memory (EPROM), electrically erasable programmable read-only memory (EEPROM), registers, a hard disk, a removable disk, a compact disc-read-only memory (CD-ROM), and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits, such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, digital signal processors (DSPs), and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application-specific integrated circuit (ASIC) with the processor, the bus interface, the user interface, supporting circuitry, and at least a portion of the machine-readable media integrated into a single chip, or with one or more programmable gate arrays (PGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into random access memory (RAM) from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise random access memory (RAM), read-only memory (ROM), electrically erasable programmable read-only memory (EEPROM), compact disc-read-only memory (CD-ROM) or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., random access memory (RAM), read-only memory (ROM), a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for an end-to-end boundary lane detection system, comprising:
   gridding a red-green-blue (RGB) image of a roadway captured by a camera sensor mounted on an ego vehicle into a plurality of image patches of a grid image;
   generating, using a transformer self-attention network, different image patch embeddings to learn correlations and exchange a context between the different image patch embeddings;
   decoding the different image patch embeddings into predetermined categories of lane boundaries, grid offsets from a center of the grid image, and instance identifications of the different image patch embeddings; and
   generating lane boundary keypoints corresponding to at least one lane of the RGB image of the roadway based on the decoding into predetermined categories of lane boundaries or background, grid offsets from a center of the grid image, and instance identifications of the different image patch embeddings.

2. The method of claim 1, further comprising:
   planning a trajectory of the ego vehicle based on the lane boundary keypoints corresponding to the at least one lane of the RGB image of the roadway; and
   operating the ego vehicle along the trajectory through the at least one lane of the roadway according to the lane boundary keypoints corresponding to the at least one lane.

3. The method of claim 1, in which the generating of the different image patch embeddings comprises providing the plurality of image patches to a transformer encoder to generate the different image patch embeddings to learn the correlations and exchange the context between the different image patch embeddings using the transformer self-attention network.

4. The method of claim 3, in which the ego vehicle comprises an autonomous vehicle.

5. The method of claim 1, in which decoding the different image patch embeddings comprises:
   providing the different image patch embeddings to a multi-layer perceptron (MLP) block; and
   generating, by the MLP block, the predetermined categories, the grid offsets, and the instance identifications.

6. The method of claim 1, in which decoding the different image patch embeddings comprises:
   providing the different image patch embeddings to a recognition head, a localization head, and an instance head;
   generating, by the recognition head, the predetermined categories;
   generating, by the localization head, the grid offsets; and
   generating, by the instance head, the instance identifications.

7. The method of claim 1, in which generating the lane boundary keypoints comprises:
   generating left boundary lane keypoints for a lane of a roadway;
   generating right boundary lane keypoints for the lane of the roadway; and
   generating a center boundary lane keypoint for the lane of the roadway.

8. The method of claim 1, further comprising:
   generating left boundary lane keypoints for an exit lane of a roadway; and
   generating right boundary lane keypoints for the exit lane of the roadway.

9. A non-transitory computer-readable medium having program code recorded thereon for end-to-end boundary lane detection, the program code being executed by a processor and comprising:
   program code to grid a red-green-blue (RGB) image of a roadway captured by a camera sensor mounted on an ego vehicle into a plurality of image patches of a grid image;
   program code to generate different image patch embeddings to learn correlations and exchange a context between the different image patch embeddings using a transformer self-attention network;
   program code to decode the different image patch embeddings into predetermined categories of lane boundaries, grid offsets from a center of the grid image, and instance identifications of the different image patch embeddings; and
   program code to generate lane boundary keypoints corresponding to at least one lane of the RGB image of the roadway based on the decoding into predetermined categories of lane boundaries, grid offsets from the center of the grid image, and instance identifications of the different image patch embeddings.

10. The non-transitory computer-readable medium of claim 9, further comprising:
    program code to plan a trajectory of the ego vehicle based on the lane boundary keypoints of the RGB image; and
    program code to operate the ego vehicle along the trajectory through the at least one lane of the roadway according to the lane boundary keypoints corresponding to the at least one lane.

11. The non-transitory computer-readable medium of claim 9, in which the program code to generate the different image patch embeddings comprises program code to provide the plurality of image patches to a transformer encoder to generate the different image patch embeddings to learn the correlations and exchange the context between the different image patch embeddings using the transformer self-attention network.

12. The non-transitory computer-readable medium of claim 11, in which the ego vehicle comprises an autonomous vehicle.

13. The non-transitory computer-readable medium of claim 9, in which the program code to decode the different image patch embeddings comprises:
    program code to provide the different image patch embeddings to a multi-layer perceptron (MLP) block; and
    program code to generate, by the MLP block, the predetermined categories, the grid offsets, and the instance identifications.

14. The non-transitory computer-readable medium of claim 9, in which the program code to decode the different image patch embeddings comprises:
    program code to provide the different image patch embeddings to a recognition head, a localization head, and an instance head;
    program code to generate, by the recognition head, the predetermined categories;
    program code to generate, by the localization head, the grid offsets; and
    program code to generate, by the instance head, the instance identifications.

15. The non-transitory computer-readable medium of claim 9, in which the program code to generate the lane boundary keypoints comprises:
    program code to generate left boundary lane keypoints for a lane of a roadway;
    program code to generate right boundary lane keypoints for the lane of the roadway; and
    program code to generate a center boundary lane keypoint for the lane of the roadway.

16. The non-transitory computer-readable medium of claim 9, further comprising:
    program code to generate left boundary lane keypoints for an exit lane of a roadway; and
    program code to generate right boundary lane keypoints for the exit lane of the roadway.

17. A system for end-to-end boundary lane detection, the system comprising:
    an image patch generation module to grid a red-green-blue (RGB) image of a roadway captured by a camera sensor mounted on an ego vehicle into a plurality of image patches;
    an image patch embedding module to generate different image patch embeddings to learn correlations and exchange a context between the different image patch embeddings using a transformer self-attention network;
    an image patch decoding module to decode the different image patch embeddings into predetermined categories of lane boundaries, grid offsets from a center of the grid image, and instance identifications of the different image patch embeddings;
    a keypoint generation module to generate lane boundary keypoints corresponding to at least one lane of the RGB image of the roadway based on the decoding into the predetermined categories of lane boundaries, the grid offsets from the center of the grid image, and the instance identifications of the different image patch embeddings; and
    a controller circuitry to operate the ego vehicle along a trajectory through the at least one lane of the roadway according to the generated lane boundary keypoints corresponding to the lane.

18. The system of claim 17, further comprising a planner to plan the trajectory of the ego vehicle based on the lane boundary keypoints corresponding to the at least one lane of the RGB image of the roadway.

19. The system of claim 17, in which the image patch embedding module further comprises a transformer encoder to generate the different image patch embeddings to learn the correlations and exchange the context between the different image patch embeddings using the transformer self-attention network.

20. The system of claim 17, in which the image patch decoding module comprises a multi-layer perceptron (MLP) block to generate the predetermined categories, the grid offsets, and the instance identifications from the different image patch embeddings.

* * * * *